June 29, 1937. W. WATERVAL 2,085,282

WATER WHEEL AND PROPELLER

Filed May 21, 1935  3 Sheets—Sheet 1

INVENTOR.
WILLIAM WATERVAL
BY Peter M. Boesen
ATTORNEY.

June 29, 1937. W. WATERVAL 2,085,282
WATER WHEEL AND PROPELLER
Filed May 21, 1935    3 Sheets-Sheet 2

INVENTOR.
WILLIAM WATERVAL
BY
ATTORNEY.

June 29, 1937.  W. WATERVAL  2,085,282
WATER WHEEL AND PROPELLER
Filed May 21, 1935  3 Sheets-Sheet 3

INVENTOR.
WILLIAM WATERVAL
BY Peter G. Boesen
ATTORNEY.

Patented June 29, 1937

2,085,282

UNITED STATES PATENT OFFICE 2,085,282

WATER WHEEL AND PROPELLER

William Waterval, New York, N. Y., assignor of one-fourth to Axel Paulsen, Brooklyn, N. Y.

Application May 21, 1935, Serial No. 22,521

2 Claims. (Cl. 170—168)

This invention relates to new and useful improvements in water-wheels and propellers, and has for its object to provide a new kind of propeller or water-wheel whereby a great speed or pushing power for a vessel can be obtained by only a small amount of power.

This invention naturally will thus not only provide a saving in fuel consumption but will also decrease the size and cost of the engines as well as cause a saving in space and the cost of maintenance.

This saving is made possible by the unique construction of my new water-wheel where no power is lost by water being radially driven outwardly from the wheel, but said power is utilized to the fullest extent in the desired direction, that is, as well forward as backward.

Other objects are, the elimination of vibration created by the fast rotation of the present used propellers.

Further, a hundred per cent propulsive efficiency whether the vessel is empty or filled with cargo; the construction being so arranged that even on a high floating vessel, the water-wheel will be fully submerged, thus avoiding the unpleasant and destructive effect of a propeller sucking air while ploughing through seaway.

The danger of broken propellers is practically eliminated, as my water-wheel is completely surrounded by a protecting bushing.

My new water-wheel is applicable to any vessel, steel as well as wooden boats, old or new, and will be easy to install, as well as to replace.

The modification shown in Figures 15 to 18, inclusive, will be especially useful for oil tankers where the pumps installed for the purpose of loading and unloading the oil, will be sufficient for this specially constructed modification of my invention.

The main features of the invention are, the four blades the pitch of which may be according to the desired results. The elimination of the main shaft, as transmitter of power from engine to wheel, the force causing the necessary rotation being applied at the circumference of said wheel by a pinion gear and a corresponding spurgear fastened to the thrust collar, which surrounds the four blades.

As the construction of my invention is comparatively simple the cost of manufacturing the same should be correspondingly low.

With the above and other objects in view, this invention consists of the novel features of construction, combination and arrangement of parts hereinafter fully described, claimed and illustrated in the accompanying drawings forming part of this application and in which similar characters of reference indicate corresponding parts in all views, and in which:

Figure 1 is a stern view of a vessel with a single water-wheel installed thereon while

Figure 8 is a single wheel unit ready for installation; while

Figure 10 is a transverse sectional view indicating a modification in construction, inasmuch as the ballbearing is here replaced with roller-bearings; while

Figure 14:
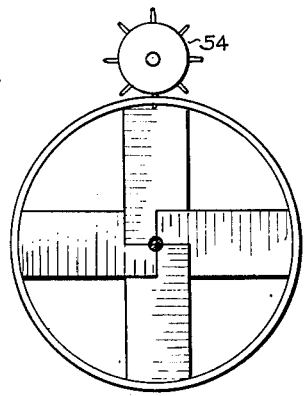

Figure 14 a front elevational view of another modification. The spur gear is here replaced with a row of holes corresponding to a sprocket toothed gear. This modification is mainly for the purpose of toy boats.

Figure 15:
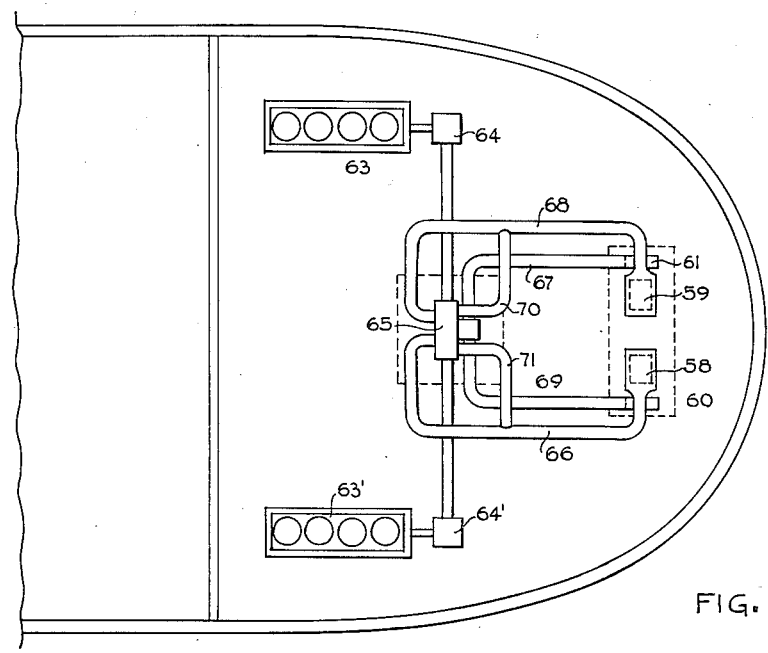

Figure 15 is a plan view of a vessel showing engines and machinery incidental to my last modification.

Figure 16:
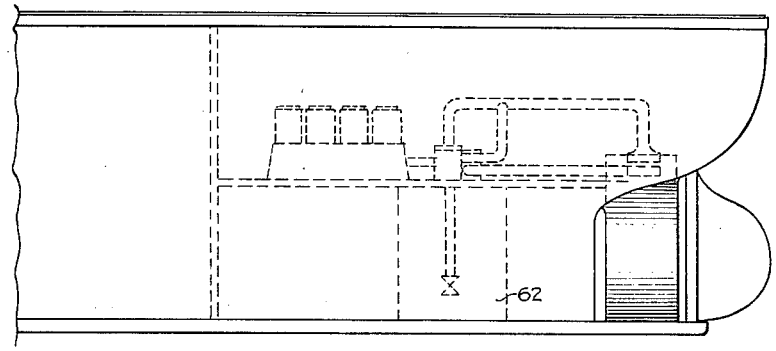

Figure 16 is a side elevational view of the same, while

Figure 17:
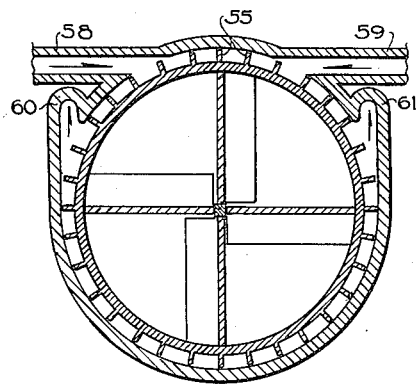

Figure 17 is a transverse sectional view showing the double intake and discharge in this modified water-wheel or more correctly hydraulic turbine water-wheel.

Figure 18:
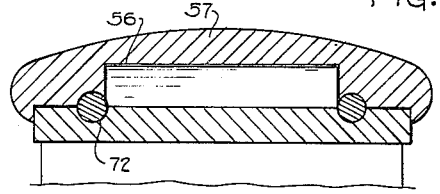

Figure 18 is a sectional detail view clarifying the construction of same.

Referring more particularly to the drawings, 20 indicates a single water-wheeled installed on a vessel 21. Said wheel consists of four blades 22, outwardly fastened securely to a cylinder-shaped ring 23 the thrust-collar. The length of the latter is determined in proportion to the size of the blades. In the center said blades all meet at one point 24, forming one solid unit. The pitch of the blades are determined by the speed and driving power desired.

The central part of the thrust-collar is on the outside provided with a circular spurgear 25 and on both sides of same are a ballbearing arrangement 26, thereby making the rotation of the water-wheel as smooth as possible inside of the protecting bushing 27.

Figure 1:
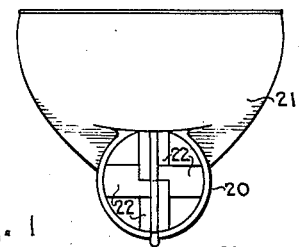
Figure 2:
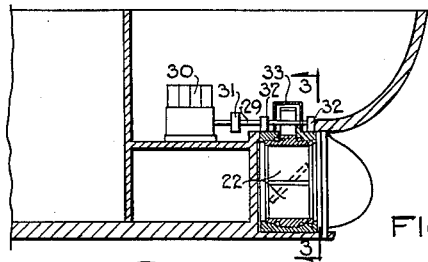
Figure 2 is a transverse sectional view of the same, showing the arrangement of the engine, etc., in regard to the water-wheel.
Figure 3:
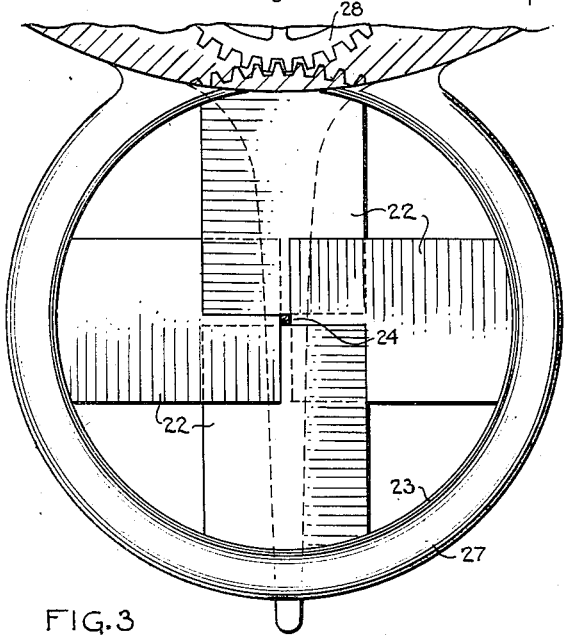
Figure 3 is partly a sectional view on the line 3—3 in Figure 2, showing the wheel and the embodying bushing in elevation.
Figure 4:
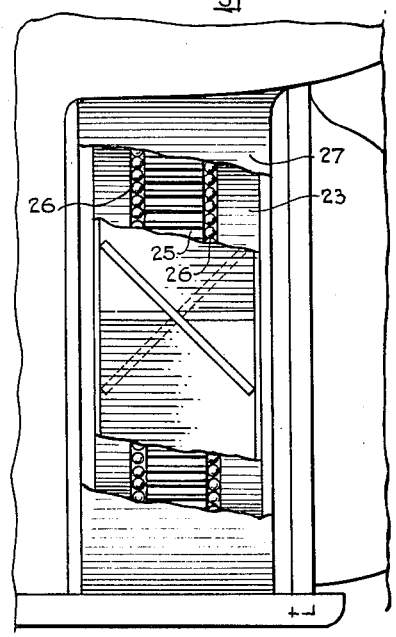
Figure 4 is a side elevational view of same with part of the bushing and also the thrust collar removed in order to show arrangement of the gear and ballbearing as well as the blades.
Figure 5:
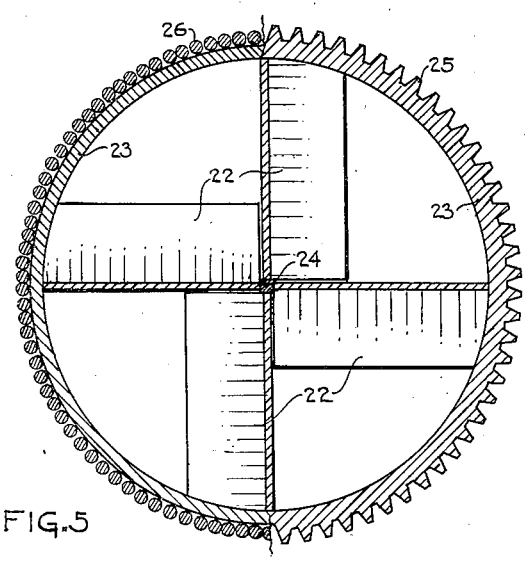
Figure 5 is a transverse sectional view through the thrust collar and blades half of the drawing through the spurgear, the other half through the ballbearing; the bushing not being shown herein.
Figure 6:
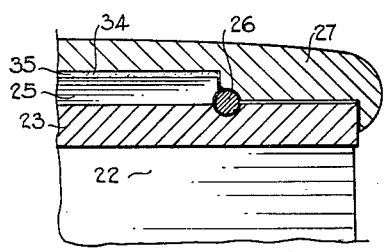
Figure 6 is a detail sectional view further illustrating the thrust collar and the ball bearing.

Corresponding to the spurgear is a pinion gear 28 which again by means of a central shaft 29 is connected to the engine 30. A flexible coupling 31, bearings 32 and a housing 33 will naturally be included as necessary parts of the equipment; this will especially be seen in Figure 2.

The bushing, which in addition to being a housing with ballbearing, also serves the purpose of protecting the rotating wheel from damage, may be made in two sections and bolted together, a feature which might be of value especially in case of a replacement. The recessed portion 34 of said bushing provides ample space for the necessary oil or grease 35.

Figure 7:
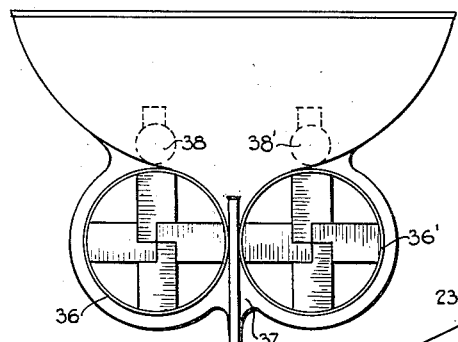
Figure 7 shows a double wheel arrangement. On the elevational stern view the two engines and pinion gears are shown in dotted lines.
Figure 8:
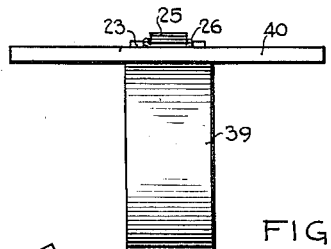

In the first modification as shown in Figure 7, two wheels 36 and 36' are shown. These wheels are both of the same construction, as before described; they may, however, both be embodied in one single bushing as shown at 37, or as two completely separated units. Each wheel is provided with its own pinion gear 38 and 38' respectively.

Where a flat-bottomed vessel is to be provided with my new water-wheel, a construction as shown in Figure 8 may be desirable. Here the bushing 39 has a flange 40 which forms the means whereby the fastening to said boat is arranged.

Figure 9:
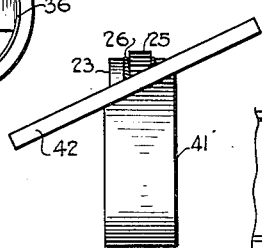
Figure 9 shows a slight modification of same designed for a different shaped vessel.
Figure 10:
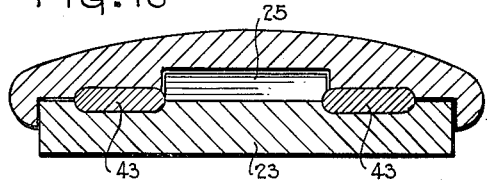

Figure 9 has another type of bushing 41 although similar to the one shown in Figure 8, the flange 42 is here shown in an angle to the wheel; in both cases the spurgear is barely visible, and just enough for the pinion gear to make a perfect contact. In Figure 10 the ballbearing is replaced with rollers 43, while the construction is otherwise the same.

Figure 11:
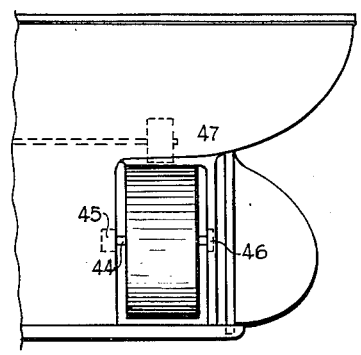
Figure 11 shows a side elevational view of another slight modification. The bearing is here on a central shaft, while the gear drive remains the same.

In Figure 11 the bearing is removed from the bushing and arranged on a central shaft 44 as indicated by 45 and 46 forming parts of one in this case necessary frame 47. The pinion and spurgear, as well as the arrangement of the blades, however, remain the same.

Figure 12:
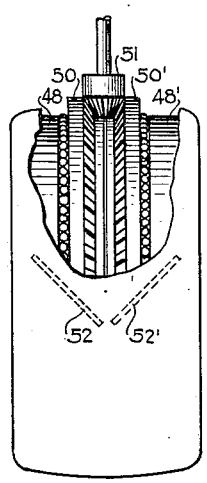
Figure 12 shows still another modification, as a cut out portion in the elevational view illustrates a double wheel with blades turned in opposite directions, each wheel having a beveled gear driven by a single beveled pinion.

Figure 12 illustrates arrangement of two wheels 48 and 48' rotating in opposite directions in one bushing 49.

The ordinary spur and pinion gear are here replaced with beveled gears 50 and 50', one for each wheel; while a single beveled pinion gear 51, serves to actuate both.

Naturally the blades in the one wheel 48' has to be pitched in the opposite direction to those on wheel 48 as will be noted from 52 and 52'.

Figure 13:
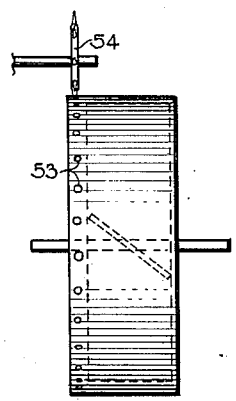
Figure 13 is a side elevational view.

In the Figures 13 and 14, the spurgear is replaced with a row of holes 53; while a sprocket toothed gear 54 is replacing the pinion.

Figure 17 shows a schematic arrangement of my last modification; while the arrangement of the blades remain the same, the means of transmitting power from the engine to the wheel is here converted into a hydraulic turbine propeller.

Instead of the spurgear, radially extending flanges 55 are arranged approximately 4-5" apart. These are so constructed as to form a snug fitting in the recessed portion 56 of the bushing 57. Said bushing is provided with four nozzles 58, 59, 60 and 61. A hydraulic pump will, if ahead motion is desired force water or oil in through nozzle 58 thereby forcing the wheel to rotate; the discharge being the nozzle 60.

While water will be discharged back into the ocean, oil if used will go back to the tank 62 shown in dotted lines in Figure 16.

For astern motion nozzles 58 and 60 will be closed and automatically 59 and 61 go into use.

The whole operation naturally is done in the engine room from the navigating bridge, and is merely a matter of opening and closing of valves.

Figure 15 shows two engines 63 and 63' connected to pumps 64 and 64', the one unit being for emergency. Pumps are through a manifold 65 connected with the wheel, numeral 66 indicates the feed line for ahead motion, and 67 the discharge for same. Numeral 68 is the feed line for astern motion with 69 serving as the discharge. Numerals 70 and 71 indicate bypasses, whereby complete control of the wheel can be maintained. Figure 18 shows a ballbearing arrangement 72, and, if desired, a ballbearing central shaft may also be employed.

It is obvious that changes may be made in the form, construction and arrangement of the several parts, as shown, within the scope of the appended claims, without departing from the spirit of the invention, and I do not therefore wish to limit myself to the construction and arrangement shown and described herein.

What I claim as new, and desire to secure by Letters Patent of the United States, is:

1. In a propelling system for ships, a waterwheel comprising four substantially rectangular-shaped blades mounted in an annular rotatable member, said blades being arranged at an angle to one another and having their inner ends connected at one point, the outer ends of said blades being securely attached to the inner periphery of said annular member.

2. In a propelling system for ships, a waterwheel comprising four substantially rectangular-shaped blades mounted in an annular rotatable member, said blades being arranged at an angle to one another and having their inner ends connected at a point, the outer ends of said blades being securely attached to the inner periphery of said annular member, the latter having the surface of its outer periphery geared, so constructed and arranged to connect said annular member to means for driving the water-wheel.

WILLIAM WATERVAL.